United States Patent
Hossain et al.

(10) Patent No.: US 11,121,894 B2
(45) Date of Patent: *Sep. 14, 2021

(54) DIRECT SEQUENCE DETECTION AND EQUALIZATION

(71) Applicant: Rambus Inc., Sunnyvale, CA (US)

(72) Inventors: Masum Hossain, Alberta (CA); Maruf H. Mohammad, Milpitas, CA (US)

(73) Assignee: Rambus Inc., San Jose, CA (US)

( * ) Notice: Subject to any disclaimer, the term of this patent is extended or adjusted under 35 U.S.C. 154(b) by 196 days.

This patent is subject to a terminal disclaimer.

(21) Appl. No.: 16/113,900

(22) Filed: Aug. 27, 2018

(65) Prior Publication Data
US 2019/0052490 A1  Feb. 14, 2019

Related U.S. Application Data

(63) Continuation of application No. 15/624,556, filed on Jun. 15, 2017, now Pat. No. 10,091,036, which is a continuation of application No. 15/006,981, filed on Jan. 26, 2016, now Pat. No. 9,755,866.

(60) Provisional application No. 62/107,947, filed on Jan. 26, 2015.

(51) Int. Cl.
  *H04L 25/49* (2006.01)
  *H04L 25/03* (2006.01)

(52) U.S. Cl.
  CPC .... *H04L 25/4917* (2013.01); *H04L 25/03019* (2013.01); *H04L 25/03178* (2013.01)

(58) Field of Classification Search
  CPC .................................................. H04L 25/4917
  USPC ............................................................ 375/232
  See application file for complete search history.

(56) References Cited

U.S. PATENT DOCUMENTS

| | | | | |
|---|---|---|---|---|
| 6,278,732 B1* | 8/2001 | Beidas | ............. | H04L 25/03178 375/235 |
| 7,177,352 B1* | 2/2007 | Plasterer | ............. | H04L 25/0307 375/232 |
| 9,755,866 B2* | 9/2017 | Hossain | ............. | H04L 25/4917 |
| 2008/0068245 A1* | 3/2008 | Kuramochi | ............. | C07K 1/22 341/155 |

OTHER PUBLICATIONS

Kim, Jaeha et al., "Equalizer Design and Performance Trade-Offs in ADC-Based Serial Links", IEEE Transactions on Circuits and Systems—I: Regular Papers, vol. 58, No. 9, Sep. 2011, pp. 2096-2107. 12 Pages.

* cited by examiner

*Primary Examiner* — Lihong Yu
(74) *Attorney, Agent, or Firm* — Park, Vaughan, Fleming & Dowler LLP; Laxman Sahasrabuddhe

(57) ABSTRACT

Methods and apparatuses for direct sequence detection can receive an input signal over a communication channel. Next, the input signal can be sampled based on a clock signal to obtain a sampled voltage. A set of reference voltages can be generated based on a main cursor, a set of pre-cursors, and a set of post-cursors associated with the communication channel. Each generated reference voltage in the set of reference voltages can correspond to a particular sequence of symbols. A sequence corresponding to the sampled voltage can be selected based on comparing the sampled voltage with the set of reference voltages.

20 Claims, 5 Drawing Sheets

DIRECT SEQUENCE DETECTION AND EQUALIZATION

RELATED APPLICATION

This application is a continuation application of, and claims priority to, U.S. application Ser. No. 15/624,556, filed on 15 Jun. 2017, the contents of which are herein incorporated by reference in their entirety for all purposes. U.S. application Ser. No. 15/624,556, is a continuation application of, and claims priority to, U.S. application Ser. No. 15/006,981, filed on 26 Jan. 2016, issued as U.S. Pat. No. 9,755,866 on 5 Sep. 2017, the contents of which are herein incorporated by reference in their entirety for all purposes. U.S. application Ser. No. 15/006,981 claims benefit of U.S. Provisional Application Ser. No. 62/107,947, filed on 26 Jan. 2015, entitled "Unified Approach for Analog-To-Digital Converter (ADC) Design, Timing, Recovery, Equalization, and AGC for High-Speed Communication Channels" by the same inventors, the contents of which are herein incorporated by reference in their entirety for all purposes.

BACKGROUND

This disclosure relates to electronic circuits. Specifically, this disclosure relates to a high-speed wire-line receiver design that uses digital equalization, symbol detection, and sequence detection.

Data communication bandwidth requirements continue to increase at a rapid pace because of a number of technology trends. Newer smartphones and other consumer electronic devices have higher video resolutions and more powerful computing platforms that can support faster and more bandwidth hungry applications. Cloud computing continues to become more popular as more users move to cloud based services and storage solutions. Due to these trends, there continues to be a strong need for communication circuits that can operate at higher speeds without consuming high amounts of power or requiring large amounts of chip area.

SUMMARY

Some embodiments described herein feature methods and/or apparatuses for direct sequence detection. Some embodiments can receive an input signal over a communication channel. Next, the input signal can be sampled based on a clock signal to obtain a sampled voltage. A first set of reference voltages can be generated based on a main cursor and at least one pre-cursor associated with the communication channel. In addition to the main cursor and the at least one pre-cursor, some embodiments can also use additional pre-cursors and one or more post-cursors for computing the reference voltages. Each generated reference voltage in the first set of reference voltages can correspond to a particular sequence of symbols. A sequence corresponding to the sampled voltage can be selected based on comparing the sampled voltage with the first set of reference voltages. Note that each symbol in the sequence of symbols is transmitted by a transmitter at successive time instances, and wherein the sequence of symbols is selected based on the sampled voltage that is sampled at a single time instance. For example, a transmitter may send symbol $s_1$, $s_2$, and $s_3$ at times $t_1$, $t_2$, and $t_3$, respectively to a receiver over a communication channel. Next, the receiver may detect all three symbols, e.g., symbols $s_1$, $s_2$, and $s_3$, based on a single voltage sample that was taken at time $t_x$. This is possible because the voltage sample at time $t_x$ can include information about all three symbols due to inter-symbol interference (ISI) caused by the non-ideal nature of the communication channel.

When multi-level signaling is used, each symbol can correspond to multiple bits. For example, if the multi-level signaling includes 8 levels, then each voltage level can correspond to a symbol and can encode three bits. Some embodiments described herein can remove intra-symbol interference based on bits of detected symbols in multi-level signaling. In other words, these embodiments can remove interference that may occur between the first, second, and third bits of a single symbol. This is in addition to any inter-symbol interference removal that is performed by the system.

In some embodiments, selecting the sequence can comprise: (i) generating a set of $2^M$ possible sequences based on comparing the sampled voltage with the first set of reference voltages; and (ii) selecting a progressively smaller subset of possible sequences from the set of $2^M$ possible sequences based on M previously detected symbols.

In some embodiments, selecting the sequence can comprise: (i) selecting a plurality of probable sequences; (ii) comparing a symbol in at least one of the plurality of probable sequences with a corresponding symbol that was predicted and/or detected in a previously detected sequence; and (iii) selecting the sequence from the plurality of probable sequences based on a result of said comparing.

In some embodiments, selecting the sequence can comprise: (i) generating a second set of reference voltages that are uniformly spread out between two reference voltages in the first set of reference voltages that are closest to the sampled voltage; and (ii) computing two probability values based on comparing the second set of reference voltages with the sampled voltage, wherein the two probability values correspond to the two reference voltages in the first set of reference voltages that are closest to the sampled voltage.

Some embodiments can comprise a sequence detection circuit. Some embodiments can comprise a receiver in a communication system that includes a sequence detection circuit.

DETAILED DESCRIPTION

Figure 1:
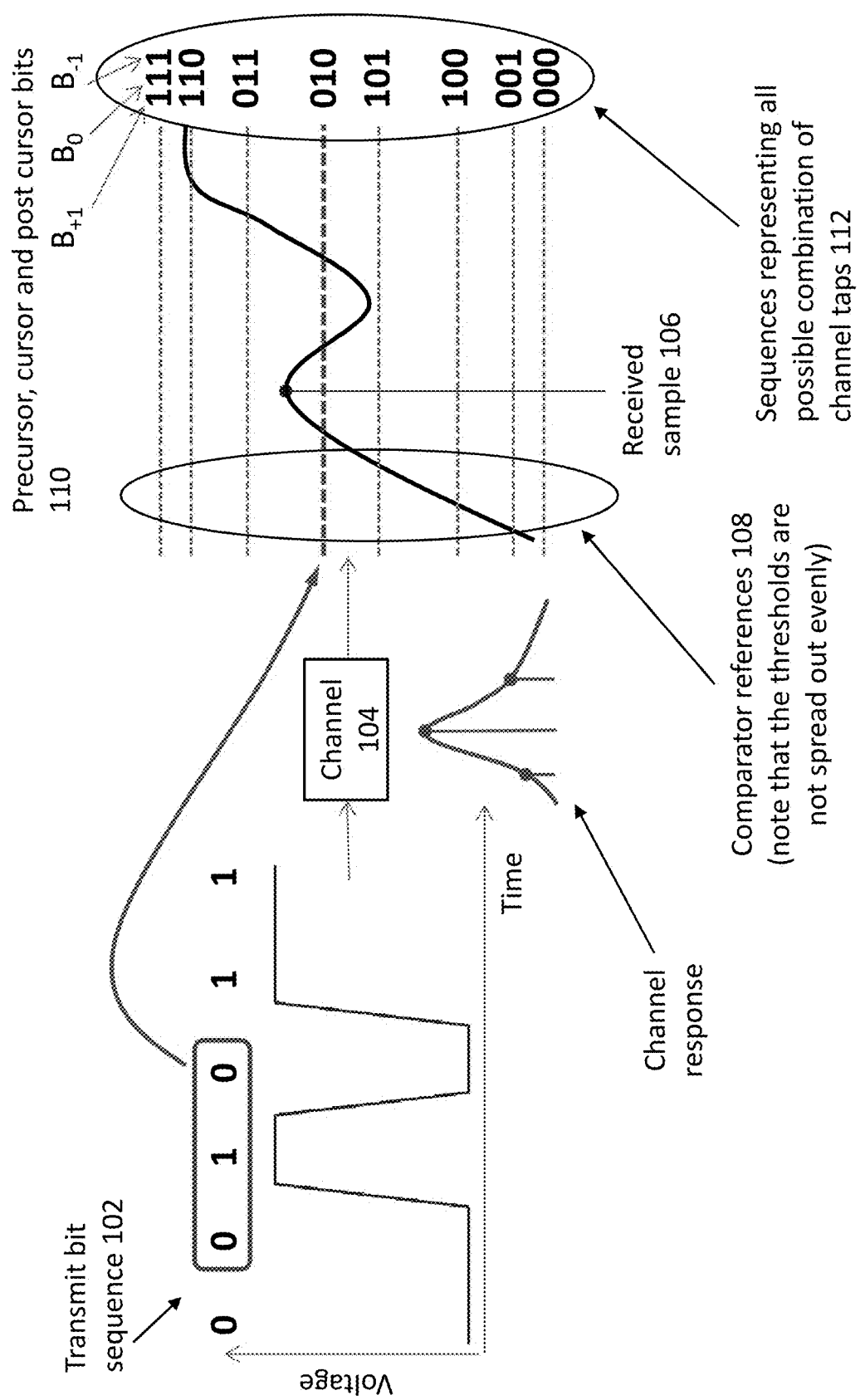
FIG. 1 illustrates how comparator references (i.e., threshold voltages) can be set for direct analog to sequence detection in accordance with some embodiments described herein.

Existing high-speed receivers mostly use symbol detection. In this approach, symbol detecting decisions are made by comparing the sampled signal value with a fixed threshold. For example, when the signal is encoded using non-return-to-zero (NRZ), the symbol is detected as a "1" if the sampled signal value is above zero (which is the threshold in NRZ), and the symbol is detected as a "0" if the sampled signal value is below zero.

High-speed communication systems often have to combat ISI that can severely impact a receiver's capability to recover the transmitted sequence. For example, in the NRZ example above, if the transmitted symbol is a "1," then it is critical to remove or reduce all of ISI components (which are introduced into the received signal because the communication channel is not ideal) from the received signal so that the sampled signal value (which is compared with the zero threshold) is above zero; otherwise the detected symbol will be incorrect.

Usually an equalization technique is employed at the receiver to correct the channel induced interference, i.e., to remove or reduce all of the ISI components from the received signal. The ISI is generally data dependent and can include signal components with contributions based on prior (post-cursor) and post (pre-cursor) received signals. Various techniques exist, both in the literature and practice, to address pre-cursor and post-cursor ISI. Usually performed at the receiver, existing equalization techniques include attempts to undo the channel introduced interference as well as reconstruction of the ISI through detected signals. With the knowledge of the channel, pre-equalization can be applied at the transmitter to cancel the impact of channel at the receiver. Unfortunately, reducing the effect of ISI through linear equalization also increases noise.

An alternative approach to equalization is to compare the distance of from a point in a multidimensional space corresponding to the received signal to each of a set of constellation points, wherein each constellation point in the set of constellation points corresponds to a possible symbol. The received signal is then converted to the symbol corresponding to the constellation point that is closest to the received signal. In the presence of ISI, this technique can be further extended by comparing the received signal to the constellation points that incorporate ISI. Usually such techniques are implemented using an analog to digital converter (ADC), in which the signal is converted to digital domain and then the distance from the received signal to the constellation points are calculated. In other words, the received analog signal is first passed through an ADC to digitize the analog signal (i.e., by representing the voltage of the analog signal as a binary number), and then the digitized analog signal can then be used to perform further processing. For example, the digitized analog signal can be used to compute the distances to the different constellation points, and a decision can be made on the received signal by finding the constellation point with the minimum distance to the digitized received signal. A major challenge in this approach is that the power consumed is very high because of the ADC and also because of the digital computations, e.g., the computation of distance to each constellation point, and then the computation required to determine the minimum distance in a set of distances. In addition, the quantization error of the ADC affects the signal-to-noise ratio (SNR) and minimum achievable bit-error-rate (BER).

Some embodiments described herein provide a low power solution for sequence detection that does not need to digitize the analog signal. In other words, some embodiments described herein can determine a sequence of symbols from a received analog signal without using ADCs. In existing techniques that use an ADC (e.g., the constellation point based techniques that were mentioned above), the thresholds of the comparators in the ADC are uniformly spread out in the desired voltage range (this is the standard way in which an analog signal is digitized). In contrast to such existing techniques, the comparator thresholds in some embodiments described herein are not uniformly spread out in the voltage range. Instead, the comparator thresholds are strategically set based on different combinations of the main ($h_0$), pre-cursor ($h_{-1}$) and post-cursors ($h_{+1}$) components. Specifically, these thresholds are chosen so that the entire signal space is subdivided into a set of regions. The received signal is then mapped to the signal space, and based on the region where the received signal is mapped to, a set of possible sequences are generated. From this set of possible sequences, the most likely sequence is selected based on the previously detected symbols. This most likely sequence is the detected sequence corresponding to the received signal.

FIG. 1 illustrates how comparator references (i.e., threshold voltages) can be set for direct analog to sequence detection in accordance with some embodiments described herein. Transmit bit sequence 102, which is a combination of 0's and 1's, is sent over a communications channel 104. The received sample 106 (the wavy line represents the received analog signal as it varies over time, and the dot represents the sampled value) experiences both ISI and noise. In a conventional sequence detector that uses an ADC, the comparator references in the ADC are uniformly spread out over the dynamic range of the input signal. In contrast to such conventional sequence detectors, the comparator references 108 in FIG. 1 are set based on different possible bit combinations as it passes through the channel. In general, for a channel with N taps, there are $2^N$ possible combinations. In this example for a channel with 3 taps, there are 8 such possibilities. Note that the comparator references 108 in FIG. 1 are not uniformly spaced, and each comparator reference corresponds to a possible sequence (shown on the right side of each comparator reference).

Out of all the possible sequences that represent all of the possible combinations of channel taps 112, the outputs of the comparators can be used to narrow down the possible sequences to a smaller subset of possible sequences. For example, in FIG. 1, by comparing the received sample with the comparator references 108, an embodiment can narrow down the sequence possibilities to the following two sequences: "011" and "010." Next, the symbols that have already been detected can then be used to select one sequence from the set of possible sequences. For example, in FIG. 1, the symbols that have already been detected can be used to determine whether the received sequence is a "011" or a "010." The details of the sequence detecting process are described below.

Figure 2:
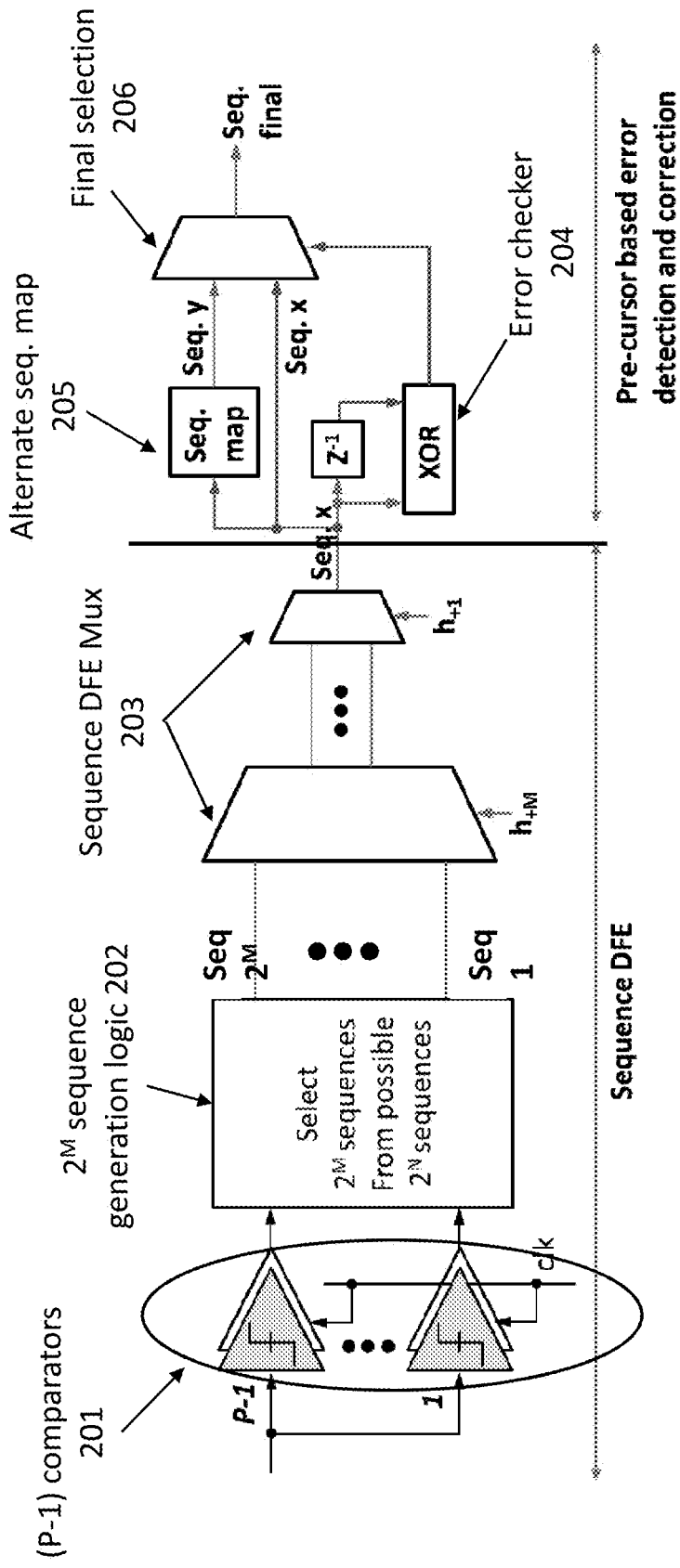
FIG. 2 illustrates a block diagram for an N-symbol sequence detector in accordance with some embodiments described herein.

FIG. 2 illustrates a block diagram for an N-symbol sequence detector in accordance with some embodiments described herein. P−1 comparators can be used to subdivide the signal space into P distinct regions. Within each region, the number of possible sequences can be determined based on the channel characteristics (e.g., based on the different combinations of channel taps). If the single bit impulse response of the communication channel has M post cursor ISI components, then each region can generate a total of $2^M$ possible N-symbol sequences, such that in each possible N-symbol sequence we have M previous symbols, one current symbol, and the remaining symbols are the future symbols.

The N-symbol sequence detector shown in FIG. 2 can perform direct digital sequence detection, i.e., it can perform digital sequence detection without digitizing the received analog signal by using an ADC. The sequence detector in FIG. 2 can select the correct sequence and can correct errors based on the detection of the next bit. Specifically, the incoming analog signal can be compared using P−1 comparators 201. The references of these comparators are spread out over the signal range as explained in FIG. 1. Sequence generation logic 202 can be used to generate $2^M$ symbol sequences based on the outputs of the P−1 comparators 201. The set of $2^M$ symbol sequences are generated based on two criteria: (i) each sequence in the set can be differentiated from other sequences based on one or more previous bits, and (ii) the set of sequences are the closest to the sampled value. In some embodiments, sequence generation logic 202 can be derived by relating the comparator outputs to each bit in the sequence. In other embodiments, a lookup table or a read-only memory (ROM) can be used (e.g., if the lookup table or ROM can be implemented with reduced area and power penalty) to determine the $2^M$ symbol sequences based on the outputs of the P−1 comparators 201. Next, a particular symbol sequence can be selected from the $2^M$ sequences based on the previous M symbols. Specifically, each of the previous M symbols can be provided as a selection input to a chain of M sequence decision-feedback-equalizer (DFE) multiplexers 203. The first multiplexer in the chain of multiplexers selects an input based on the M-th previous bit, and the last multiplexer in the chain of multiplexers selects an input based on the immediately previous bit. This way feedback latency can be managed to be less than 1 UI.

In some embodiments, pre-cursor based error correction can be performed. For example, in FIG. 2, the output from the chain of sequence DFE multiplexers is a single sequence which is shown as "seq. x" in FIG. 2. This sequence is then provided as one of the inputs to final selection multiplexer 206. Alternate sequence map 205 can output an alternate sequence based on "seq. x," and this alternate sequence (shown as "seq. y" in FIG. 2) can be provided as the other input to final selection multiplexer 206. The error checker 204 (e.g., an XOR gate) can detect an error by, for example, performing an XOR operation between "seq. x" and a delayed version of the immediately previous sequence that was outputted by the chain of sequence DFE multiplexers (the output of the z−1 delay block). The output of error checker 204 can be provided as a selection input to final selection multiplexer 206. If the output of the XOR gate is zero, then "seq. x" was the correct sequence and final selection multiplexer 206 outputs "seq. x." On the other hand, if the output of the XOR gate is not zero, then "seq. x" was incorrect, and final selection multiplexer 206 outputs "seq. y."

Figure 3:
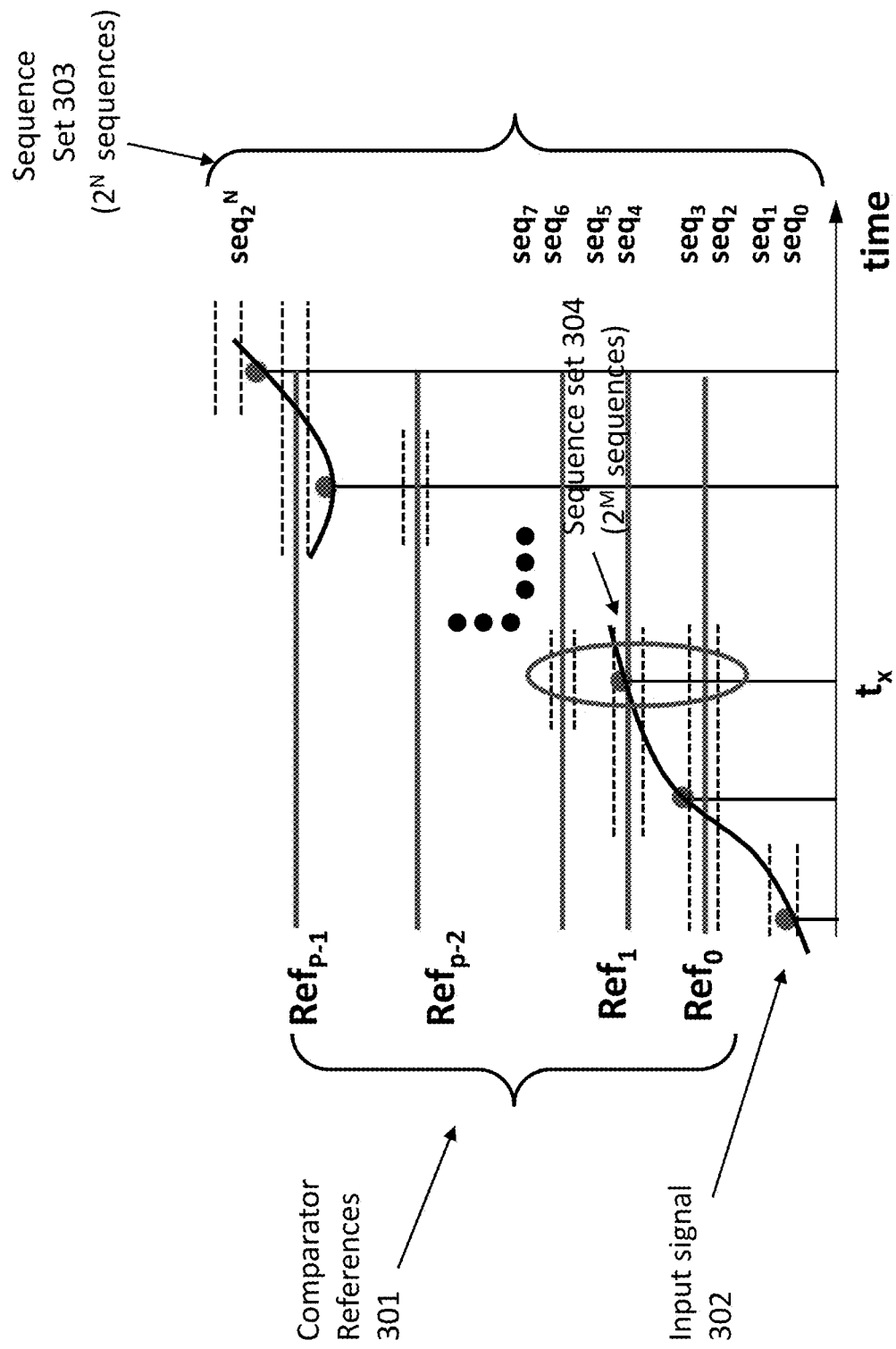
FIG. 3 illustrates a sequence generation process in accordance with some embodiments described herein.

FIG. 3 illustrates a sequence generation process in accordance with some embodiments described herein. At time $t_x$, an embodiment can determine $2^M$ sequences which are all possible sequences based on comparing the sample that was taken at time $t_x$ of input signal 302 with comparator references 301. Comparator references 301 subdivides the signal space into a set of regions, wherein each region corresponds to the signal values that lie between two adjacent reference levels. Sequence set 303 illustrates all of the possible sequences which are labeled as $seq_1$ to $seq_{2^N}$. At any given time only $2^M$ sequences from the $2^N$ possible sequences are selected. For example, at time $t_x$ sequence set 304 is selected that has $2^M$ sequences (in the specific example shown in FIG. 3, the sequence set has two sequences—$seq_4$ and $seq_5$). The set of possible sequences are determined based on two criteria: (i) each sequence can be differentiated from other sequences based on one or more previous bits, and (ii) the set of sequences are the closest to the sampled value. For example, $seq_4$ and $seq_5$ satisfy these two criteria. Specifically, these two sequences can be differentiated based on a previous bit and these two sequences are the closest to the sampled value. Note that the set of closest sequences can include more than two sequences, e.g., the set of sequences $seq_3$, $seq_4$, $seq_5$, and $seq_6$ is also a set of closest sequences to the sampled value. Using M previously detected symbols, the embodiment can select the most likely sequence from the $2^M$ possible sequences. The number of comparators P−1 is related to the sequence length N such that $P \times 2^M \geq 2^N$. In other words, the minimum number of comparators needed is $(2^N/2^M - 1)$.

The selection of most likely sequence from a group of likely sequences using previously detected symbols is referred in this description as "sequence" DFE. There are several advantages of sequence DFE over conventional speculative "symbol" DFE. In conventional speculative DFE, e.g., for NRZ signaling, $2^M$ comparators are placed as a combination of post cursor ISI components. As the number of post cursor taps or signal levels increases, number of comparators increase exponentially. Compared to that, in a sequence DFE, the number of comparators grows approximately linearly, $2^N/2^M$. This graceful comparator scaling allows more robust receiver design that is tolerant to individual comparator decision error.

In existing receiver designs, a bit or symbol error is related to its dependency to a single comparator. Although $2^M$ comparators are used in speculative DFE, only one of them is selected based on previous decisions. Therefore, the symbol decision is made by the single selected comparator and will be subject to its resolution and error tolerance. In other words, in existing solutions, although $2^M$ comparators are used in the receiver, a single comparator error can still translate to a symbol error.

In contrast to such existing techniques, some embodiments described herein that use sequence DFEs are immune to single comparator decision errors. Specifically, by adding a few extra comparators to the minimum number of comparators that are required, i.e., $(2^N/2^M - 1)$ comparators, the signal space can be partitioned with higher granularity. However, each region still allows $2^M$ number of sequence choices while providing redundancy. As a result, if an individual comparator decision error causes a different region to be selected, the correct sequence can still be part of the possible set of sequences. Eventually, the sequence DFEs can pick the most likely sequence, thereby resulting in the correct symbol decision even in the presence of an erroneous decision by an individual comparator.

The example shown in FIG. 3 also illustrates how a few extra comparators can be used to provide immunity to single comparator decision errors. Note that $seq_2$ and $seq_3$ are redundant sequences since they are selected regardless of whether the sampled value is above or below $Ref_0$. However, as the sample exceeds $Ref_1$, $seq_2$ and $seq_3$ are dropped since they are further away from the sampled value (and therefore they are not the closest symbols from the sampled value). Therefore, $seq_2$ and $seq_3$ will be chosen as possible sequences if they are in the vicinity of $Ref_0$ regardless of whether the associated comparator output is 0 or 1. In this manner, embodiments described herein use the comparator output as a "soft decision" (as opposed to a "hard decision" in existing speculative DFE techniques) to determine the approximate location of the received sample with respect to the sequences so that a set of likely sequences can be determined. As explained above, individual comparator errors do not translate to symbol error in embodiments described herein so long as the correct sequence is selected as one of the sequences in the set of likely sequences.

In addition to comparator error tolerance, sequence detection allows forward error correction through future or next symbol detection. First, the sequence detector takes advantage of the precursor ISI present in the received signal to detect next symbol. In fact, when a particular sequence is selected from $2^M$ sequences, the next symbols in the sequence are detected as a byproduct. In general, the number of detected "next symbols" are equal to the number of pre-cursors in the channel response. Usually, it is possible to limit the number of pre-cursors to one (i.e., it is possible to have just a single pre-cursor) without significant loss of SNR. For example, in FIG. 2, where the recovered sequence includes a single next bit (i.e., the number of pre-cursors is equal to 1) as part of sequence. This "next symbol" in the current sequence is compared to the "main symbol" in the next sequence to detect an error (this comparison was performed by the "XOR" gate in error checker 204 in FIG. 2). Once an error is detected, it is also possible to correct the error. The preselected code is mapped to the next most likely sequence in which the "next symbol" of the current sequence matches the "main symbol" of the next sequence. Note that this correction can be done in a feed forward manner that requires only 1 UI of additional latency.

Some embodiments described herein feature a low power solution for sequence estimation that does not require an ADC. In a conventional flash ADC, the comparators are set in such a way that their reference voltages span, uniformly or non-uniformly, the dynamic range of the input signal. The ADC outputs a digital code word for the received signal voltage (i.e., the ADC digitizes the analog input signal). Obviously, the accuracy of the conversion between the analog input and the digital code word depends on the number of comparators. Specifically, a conventional flash ADC requires $2^N$ comparators to generate an N-bit digital code word. In conventional techniques, maximum-likelihood sequence estimation can be implemented by using the well-known Viterbi Algorithm in which digital code words from the ADC are further processed. In these conventional techniques, the distances between the digitized sample and every hypothesized sequence of the channel are computed (these distances are referred to as the "branch metrics" in the literature). Note that the accuracy of the branch metric measurements is heavily dependent on the resolution of both the ADC and the subsequent digital processing. Unfortunately, an ADC that has a higher resolution and that operates at a higher speed can have a significantly higher power consumption.

Figure 4:
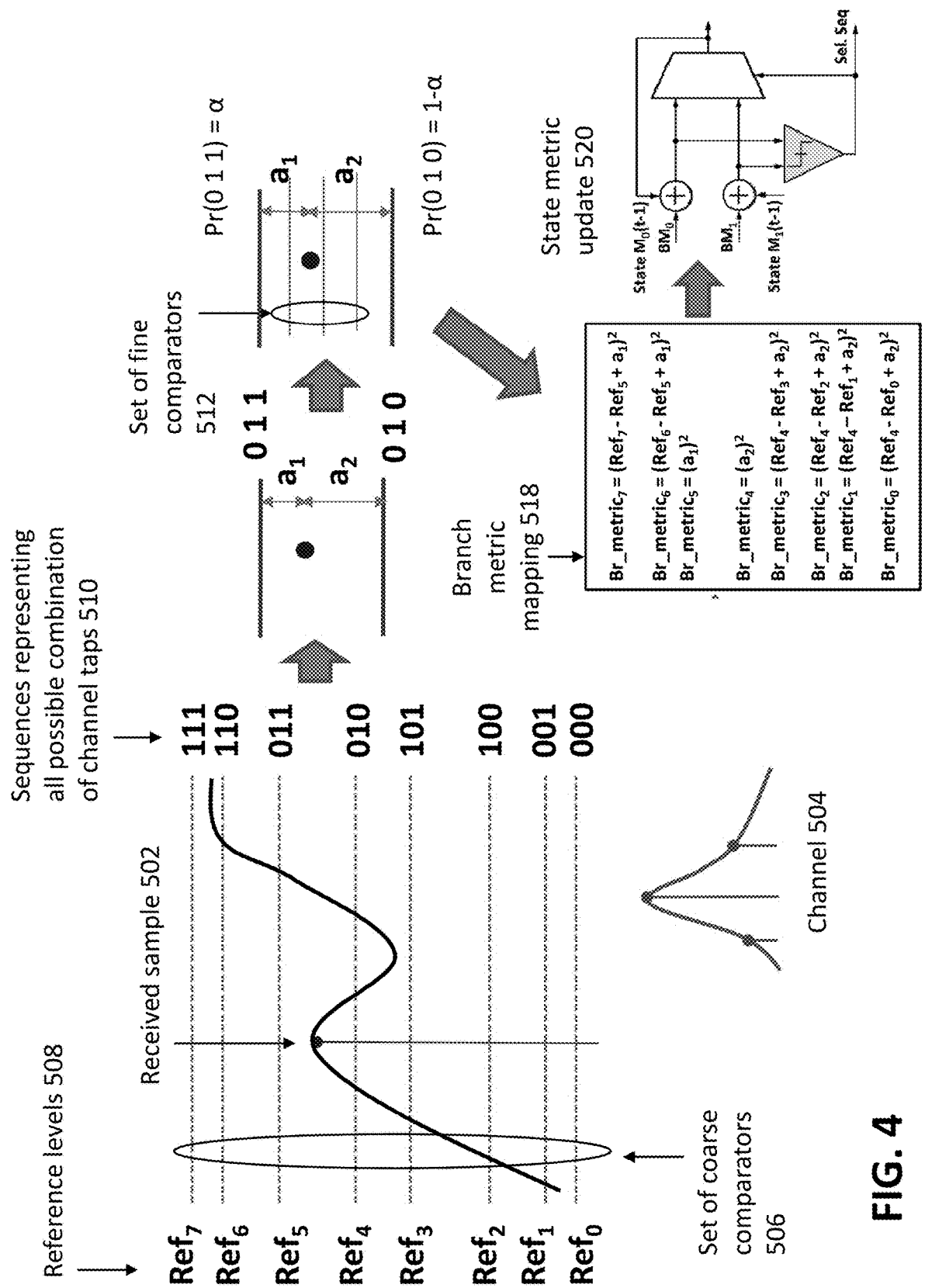
FIG. 4 illustrates a sequence detector circuit design in which a set of coarse comparator references represent different ISI combinations in accordance with some embodiments described herein.

In contrast to such existing techniques, some embodiments described herein feature an ADC-less analog front-end design in which comparators' reference voltages are set to describe different hypothesis of the transmitted sequence incorporating ISI components. FIG. 4 illustrates a sequence detector circuit design in which a set of coarse comparator references represent different ISI combinations in accordance with some embodiments described herein. Instead of converting the comparator outputs to a digital code word (as is done in conventional techniques), in the embodiment shown in FIG. 4, the comparator outputs actually reflect a group of most likely sequences through the channel. Once the outputs from the set of coarse comparators 508 are available, the outputs are used to adjust the variable references of a set of fine comparators 512. The outputs of the fine comparators 512 are then used to determine the likelihood of each sequence from the group in the probabilistic sense. This is shown in FIG. 4 with the probabilities "Pr(011)=α" and "Pr(010)=1−α." In other words, the fine comparator outputs are indicative of the probability. The fine comparator outputs are also used to map the branch metrics for each state in the Viterbi Algorithm as shown in FIG. 4. Note that in order to calculate the branch metric, only $a_1$ and $a_2$ values and the coarse comparators outputs are required. The rest are directly mapped using coarse references. Note that this ADC-less direct branch metrics calculation is a much more cost-efficient approach compared to a conventional ADC based receiver because, in a conventional ADC based receiver, the distance for each state needs to be separately computed with respect to the digitized code word.

Some embodiments described herein feature a receiver architecture that directly calculates the branch metric and feeds it to a digital signal processing (DSP) module for digital sequence estimation. As explained above, FIG. 4 illustrates a method for direct branch metric calculation. Specifically, as shown in FIG. 4, the transmitted signal is sent over the communications channel 504 and results in a received sample 502 that includes both ISI from the channel as well as noise from the receiver. A set of coarse comparators 506 are set with reference levels 508 such that they represent all possible combination of channel taps. In general, for a channel with N taps there are $2^N$ such combinations. For example, sequences representing all possible combination of channel taps 510 corresponds to a 3-tap channel. The coarse comparator outputs generate a likely group of sequences (shown in FIG. 4 as 011 and 010) based on the received sample. A set of fine comparators 512 (whose reference voltages are adjustable) can be used to compute the multi-bit distance information $a_1$ and $a_2$. The distance information can be translated into a probability of the corresponding sequences "011" and "010." The coarse and fine set of comparator outputs can be used to generate branch metrics. The branch metric mapping 518 is a one-to-one translation once $a_1$ and $a_2$ and coarse comparator outputs are known. The branch metrics are also used to update the state metrics 520 as needed in sequence estimation algorithms, e.g., in the Viterbi Algorithm.

Figure 5:
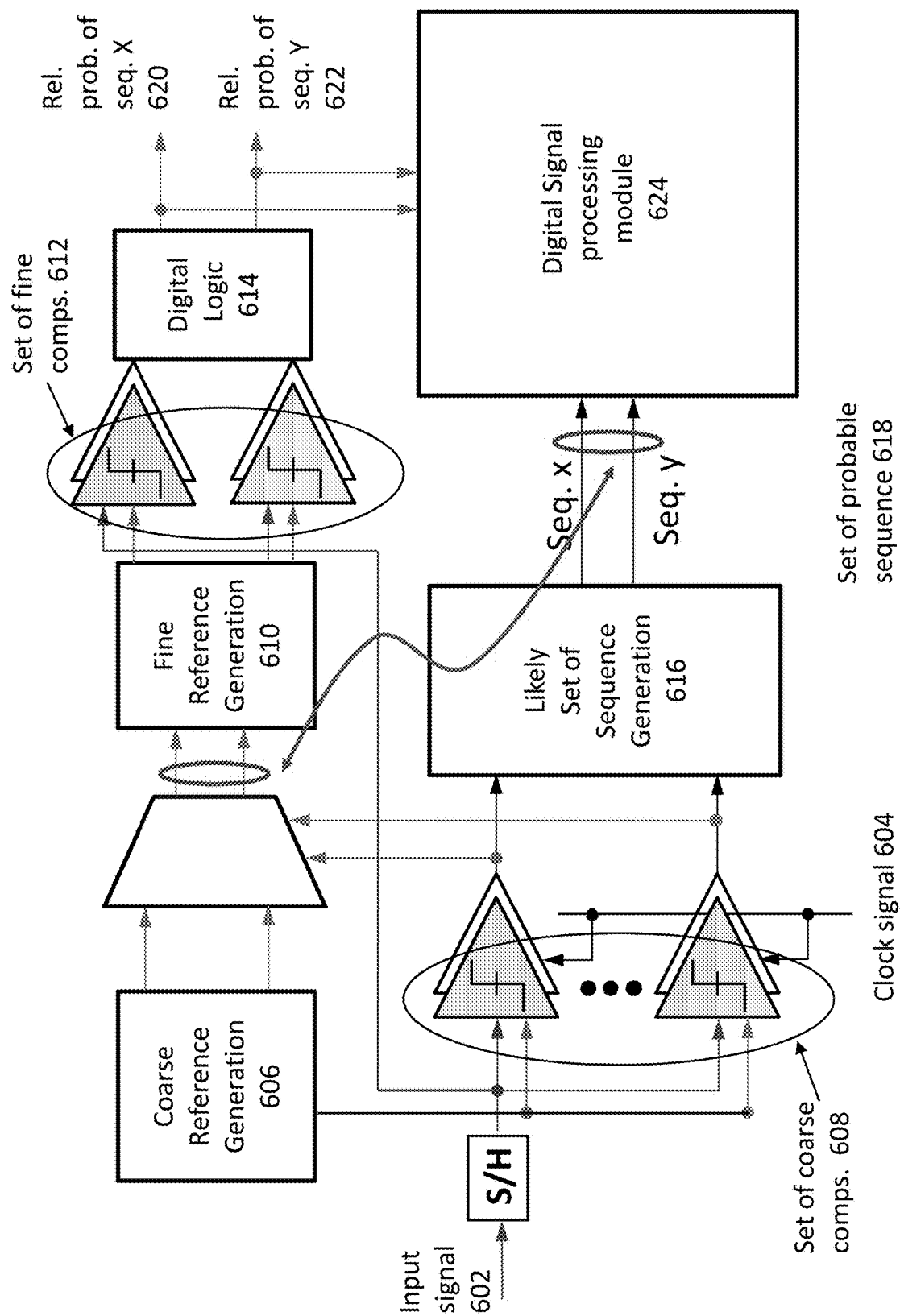
FIG. 5 illustrates a receiver that uses the sequence detector circuit design illustrated in FIG. 4 in accordance with some embodiments described herein.

FIG. 5 illustrates a receiver that uses the sequence detector circuit design illustrated in FIG. 4 in accordance with some embodiments described herein. The distances $a_1$ and $a_2$ and the corresponding coarse comparator outputs are stored for each received sample, and are further processed in DSP module 624 possibly with a lower clock speed. Sequence estimation algorithms, e.g., the Viterbi Algorithm and its variants, can be implemented in the DSP module 624 that will benefit from the efficient direct branch metric calculation described above. The receiver illustrated in FIG. 5 computes branch metrics directly from analog samples and further processing in a DSP. Specifically, the input signal 602 is processed through a set of coarse comparators 608. The coarse reference generation 606 is channel dependent and combines all possible channel taps, and sets the reference voltages of coarse comparators 608 so that the sampled input signal can be directly converted into a sequence of symbols. Coarse comparator outputs are processed to generate a set of likely sequences 616. Coarse comparator outputs also drive the adjustable fine reference generation 610 which sets the reference voltages for the set of fine comparators 612. Fine comparator outputs are processed through digital logic circuit 614 to generate probabilities 620 and 622 for sequences from the likely sequence set. The likely sequence set 618 ("seq. x" and "seq. y") along with the digital probabilities are sent to DSP module 624. Digital sequence estimation algorithms that use branch metrics can be implemented in the DSP module 624. Note that for a given received sample, digital probabilities and likely sequence set can be stored in the memory. The branch metric can be calculated using the one-to-one mapping illustrated in FIG. 4.

What is claimed is:

1. An integrated circuit (IC), comprising:
a plurality of comparators, wherein each comparator has a respective reference voltage that is adjustable, wherein each comparator outputs a result signal based on comparing a received input from a communication channel with the comparator's reference voltage, wherein reference voltages for the plurality of comparators are computed based on a main cursor and at least one pre-cursor associated with the communication channel, wherein the at least one pre-cursor corresponds to a future symbol, and wherein each computed reference voltage corresponds to a particular sequence of symbols; and
a sequence-selection circuit to select a sequence of symbols based on result signals outputted by the plurality of comparators.

2. The IC of claim 1, wherein each symbol in the sequence of symbols is transmitted over the communication channel at successive time instances, and wherein the sequence of symbols is selected based on received input that is sampled at a single time instance.

3. The IC of claim 1, wherein the sequence-selection circuit comprises:
a sequence generation circuit to generate a set of $2^M$ possible sequences of symbols based on the result signals outputted by the plurality of comparators; and
a chain of M multiplexers, where each multiplexer in the chain of M multiplexers selects a progressively smaller subset of possible sequences of symbols from the set of $2^M$ possible sequences of symbols, and wherein M previous symbols are used as select inputs for the chain of M multiplexers.

4. The IC of claim 1, wherein the sequence-selection circuit comprises:
a probable-sequence-selection circuit to select a plurality of probable sequences of symbols;
an error checking circuit to output a comparison result based on comparing a symbol in at least one of the plurality of probable sequences of symbols with a corresponding symbol that was predicted in a previously detected sequence of symbols; and
a correct-sequence-selection circuit to select the sequence of symbols from the plurality of probable sequences of symbols based on the comparison result.

5. The IC of claim 1, wherein the sequence-selection circuit comprises circuitry to remove intra-symbol interference based on bits of detected symbols in multi-level signaling.

6. The IC of claim 1, wherein the sequence-selection circuit comprises:
a plurality of fine comparators, wherein each fine comparator has a fine-comparator reference voltage that is adjustable, wherein each fine comparator outputs a fine-comparator result signal based on comparing the received input with the fine comparator's reference voltage, wherein the fine-comparator reference voltages for the plurality of fine comparators are uniformly spread between two fine-comparator reference voltages of the plurality of comparators that are closest to the received input;
a probability-quantization circuit to output two probability values based on the fine-comparator result signals outputted by the plurality of fine comparators, wherein the two probability values correspond to two sequences of symbols associated with two reference voltages of the plurality of comparators that are closest to the received input; and
a circuit to select the sequence of symbols from a set of sequences of symbols based on the two probability values.

7. A receiver in a communication system, the receiver comprising:
a plurality of comparators, wherein each comparator has a respective reference voltage that is adjustable, wherein each comparator outputs a result signal based on comparing a received input from a communication channel with the comparator's reference voltage, wherein reference voltages for the plurality of comparators are computed based on a main cursor and at least one pre-cursor associated with the communication channel, wherein the at least one pre-cursor corresponds to a future symbol, and wherein each computed reference voltage corresponds to a particular sequence of symbols; and
a sequence-selection circuit to select a sequence of symbols based on result signals outputted by the plurality of comparators.

8. The receiver of claim 7, wherein each symbol in the sequence of symbols is transmitted over the communication channel at successive time instances, and wherein the sequence of symbols is selected based on received input that is sampled at a single time instance.

9. The receiver of claim 7, wherein the sequence-selection circuit comprises:
a sequence generation circuit to generate a set of $2^M$ possible sequences of symbols based on the result signals outputted by the plurality of comparators; and
a chain of M multiplexers, where each multiplexer in the chain of M multiplexers selects a progressively smaller subset of possible sequences of symbols from the set of $2^M$ possible sequences of symbols, and wherein M previous symbols are used as select inputs for the chain of M multiplexers.

10. The receiver of claim 7, wherein the sequence-selection circuit comprises:
a probable-sequence-selection circuit to select a plurality of probable sequences of symbols;
an error checking circuit to output a comparison result based on comparing a symbol in at least one of the plurality of probable sequences of symbols with a corresponding symbol that was predicted in a previously detected sequence of symbols; and
a correct-sequence-selection circuit to select the sequence of symbols from the plurality of probable sequences of symbols based on the comparison result.

11. The receiver of claim 7, wherein the sequence-selection circuit comprises circuitry to remove intra-symbol interference based on bits of detected symbols in multi-level signaling.

12. The receiver of claim 7, wherein the sequence-selection circuit comprises:
a plurality of fine comparators, wherein each fine comparator has a fine-comparator reference voltage that is adjustable, wherein each fine comparator outputs a fine-comparator result signal based on comparing the received input with the fine comparator's reference voltage, wherein the fine-comparator reference voltages for the plurality of fine comparators are uniformly spread between two fine-comparator reference voltages of the plurality of comparators that are closest to the received input;

a probability-quantization circuit to output two probability values based on the fine-comparator result signals outputted by the plurality of fine comparators, wherein the two probability values correspond to two sequences of symbols associated with two reference voltages of the plurality of comparators that are closest to the received input; and a circuit to select the sequence of symbols from a set of sequences of symbols based on the two probability values.

13. The receiver of claim 7, comprising an input port to receive the received input over the communication channel.

14. A method, comprising:

generating a first set of reference voltages based on a main cursor and at least one pre-cursor associated with a communication channel, wherein the at least one pre-cursor corresponds to a future symbol, wherein each generated reference voltage in the first set of reference voltages corresponds to a particular sequence of symbols; and selecting, by using a sequence-selection circuit, a sequence of symbols based on comparing a received input from the communication channel with the first set of reference voltages.

15. The method of claim 14, wherein each symbol in the sequence of symbols is transmitted over the communication channel at successive time instances, and wherein the sequence of symbols is selected based on the received input that is sampled at a single time instance.

16. The method of claim 14, wherein said selecting, by using the sequence-selection circuit, the sequence of symbols comprises:

generating a set of $2^M$ possible sequences of symbols based on said comparing the received input from the communication channel with the first set of reference voltages; and selecting a progressively smaller subset of possible sequences of symbols from the set of $2^M$ possible sequences of symbols based on M previously detected symbols.

17. The method of claim 14, wherein said selecting the sequence of symbols comprises:

selecting a plurality of probable sequences of symbols;

comparing a symbol in at least one of the plurality of probable sequences of symbols with a corresponding symbol that was predicted in a previously detected sequence of symbols; and selecting the sequence of symbols from the plurality of probable sequences of symbols based on said comparing.

18. The method of claim 14, wherein said selecting the sequence of symbols comprises removing intra-symbol interference based on bits of detected symbols in multi-level signaling.

19. The method of claim 14, wherein said selecting the sequence of symbols comprises:

generating a second set of reference voltages that are uniformly spread out between two reference voltages in the first set of reference voltages that are closest to the received input;

computing two probability values based on comparing the second set of reference voltages with the received input, wherein the two probability values correspond to two reference voltages in the first set of reference voltages that are closest to the received input; and selecting the sequence of symbols from a set of sequences of symbols based on the two probability values.

20. The method of claim 14, comprising receiving an input over the communication channel.

* * * * *